United States Patent
Makosa

(10) Patent No.: US 6,629,730 B2
(45) Date of Patent: Oct. 7, 2003

(54) SEAT DISPLACEMENT MECHANISM FOR A SEAT WITH TILTING BACK

(75) Inventor: Kazimierz Makosa, Pionki Woj. Mazowieckie (PL)

(73) Assignee: Faurecia Autositze GmbH & Co. KG (DE)

( * ) Notice: Subject to any disclaimer, the term of this patent is extended or adjusted under 35 U.S.C. 154(b) by 0 days.

(21) Appl. No.: 09/970,346

(22) Filed: Oct. 3, 2001

(65) Prior Publication Data

US 2002/0060487 A1 May 23, 2002

(30) Foreign Application Priority Data

Nov. 21, 2000 (DE) .......................................... 100 57 660

(51) Int. Cl.[7] .................................................. B60N 2/20
(52) U.S. Cl. .................................. 297/341; 297/378.12
(58) Field of Search ............................. 297/344.1, 341, 297/344.11, 378.12, 378.1, 378.13

(56) References Cited

U.S. PATENT DOCUMENTS

| 5,718,477 | A | * | 2/1998 | Schuler | ...................... 297/341 |
| 5,873,629 | A | * | 2/1999 | Schuler | ...................... 297/341 |
| 6,152,533 | A | * | 11/2000 | Smuk | .......................... 297/341 |
| 6,474,739 | B1 | * | 11/2002 | Lagerweij | .................... 297/341 |

FOREIGN PATENT DOCUMENTS

| DE | 3046887 | 7/1982 | ......................... 1/6 |
| DE | 3606132 | 10/1986 | ....................... 2/20 |

* cited by examiner

Primary Examiner—Rodney B. White
(74) Attorney, Agent, or Firm—Bourque & Associates, P.A.

(57) ABSTRACT

A seat displacement mechanism for a seat, such as a vehicle seat, which includes a seat back that is attached to a seat bottom such that it may be folded about a horizontal axis and locked in the a position. The seat bottom is connected, for height adjustment, by means of front and rear linkages mounted in pairs, at least one pair of which is attached, proximate one end of the linkage to an upper rail. A portion of the upper rail is provided with a longitudinal guide area to which the lower end of a linkage may be mounted so that the linkage may move longitudinally or slide relative to a seat base. A linkage may be locked in its rearward position with respect to the upper rail, preventing seat movement.

9 Claims, 3 Drawing Sheets

SEAT DISPLACEMENT MECHANISM FOR A SEAT WITH TILTING BACK

TECHNICAL FIELD

The invention relates to a vehicle seat and more particularly, to a mechanism for allowing a seat bottom to slide and move forward when the seat back is tilted, thereby enlarging the opening or access aperture to a rear seat or compartment.

BACKGROUND INFORMATION

A vehicle seat, such as for a motor vehicle, of the type disclosed in German Patent No. DE 30 46 887 A1 is mounted on longitudinal rails along which it may slide, and its height is adjustable via linkage. The seat back is mounted so that it may swivel about the lower link point of the linkage at the guide rails, and is lockable in its normal rearward position with respect to the seat body. When the seat back is tilted forward, the seat body is displaced forward and upward so that the entry aperture or opening for a two-door vehicle is enlarged for the benefit of the back-seat passengers or access to a rear cargo area.

When the seat back is tilted backwards, the seat body automatically returns to its initial position. There is only a short lever of the rear linkage, and only a limited movement angle, available for seat body displacement along the vehicle direction of movement connected with the tilting movement of the seat back because of the locking of the linkage on the folding seat hardware. Therefore, the enlargement of the entry aperture is relatively small. Also, the design is complicated and expensive to implement. Finally, there is the disadvantage that the headrest may strike the headliner when the seat back is tilted forward, since the rear end of the seat back and the seat back are raised in such a case.

SUMMARY

Based on this state of the art, the invention has the task of forming a vehicle seat of the known type so that its displacement upon tilting the seat back forward has positive function and is achieved using simple means.

The entry aperture to the back seat may be enlarged considerably by means of the invention disclosed herein. Relatively simple elements that have reliable function are used to displace the seat body and to lock it in the use position.

In one advantageous embodiment of the invention, the folding axis of the seat back remains at the same height so that a free folding movement of the seat back is insured.

The present invention features a seat having a seat displacement mechanism. A typical seat on which the present invention may be practiced includes a seat bottom and a seat back that is attached to the seat bottom so that it may be folded forward about a horizontal axis and locked in a use position. Front and rear linkages are mounted in pairs. Each front and rear linkage is pivotably attached proximate one end to said seat bottom and pivotably attached proximate a second end to a rail mechanism attached to a seat base. At least a portion of said rail mechanism includes an upper rail that is mounted so it may slide relative to a lower rail attached to said seat base.

A locking device is also provided, for locking at least one linkage from at least one of the pair of front and rear linkages into the use position. The upper rail includes, proximate at least one pair of the pairs of front and rear linkages, a longitudinal guide area into which the second end of the at least one pair of the front and rear linkage pairs may be inserted so that at least one of the pair of front and rear linkages may slide forward and be displaced longitudinally a predetermined distance while the other pair of linkages pivot when the locking device is released and the seat back is tilted forward.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
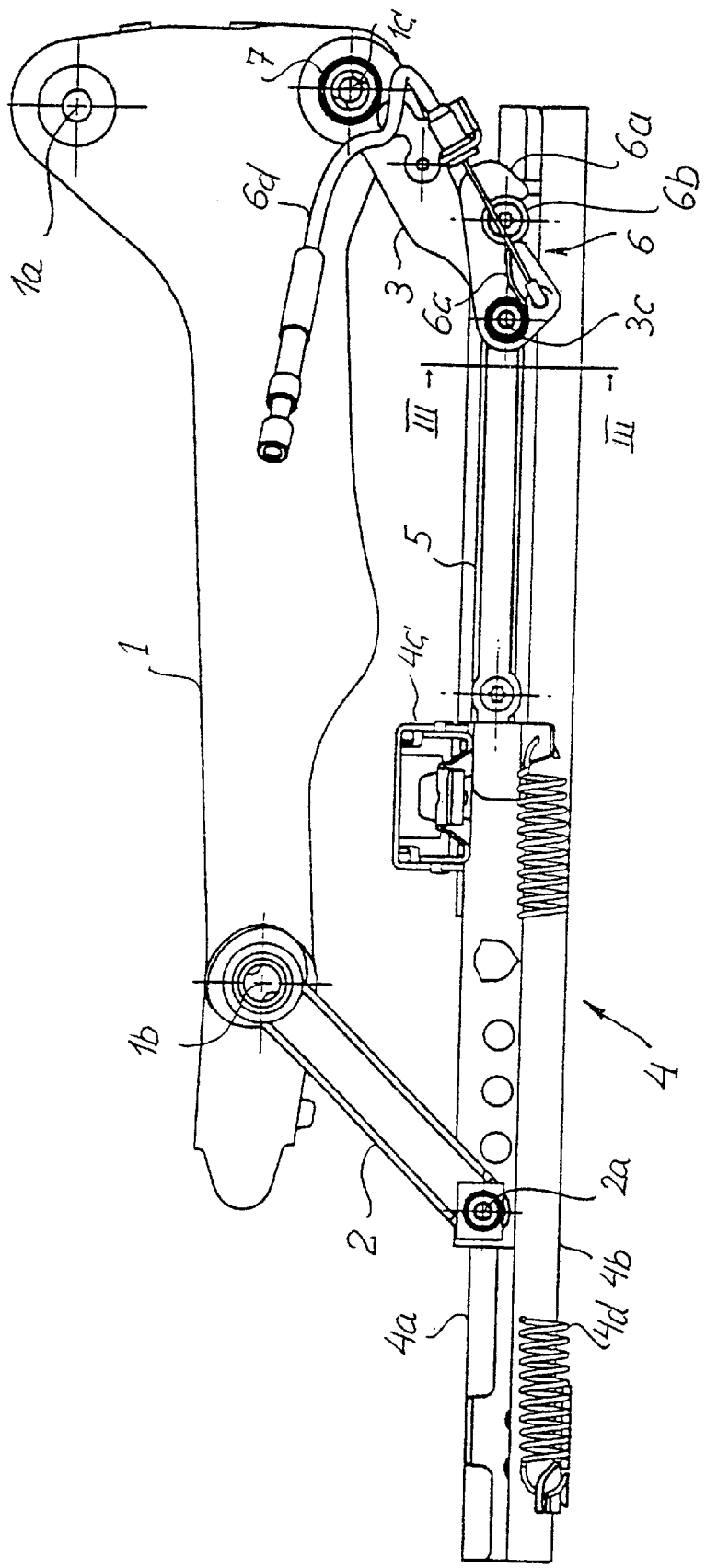
FIG. 1: a schematic side view of the seat body of a longitudinally-displaceable and height-adjustable motor vehicle seat in its use position.

The Figures show only the seat body 1 portion of a vehicle seat such as a motor vehicle seat. Although a motor vehicle seat is used as the exemplary embodiment of the present invention, this is not a limitation as the present invention may be practiced on other vehicle seats.

The seat back, which is not shown, may tilt forward about a horizontal axis 1a on the seat body 1 and may be locked to the seat body 1. The seat body 1 is secured by two front linkages 2 and two rear linkages 3 to longitudinal guide devices 4 that are arranged as a pair, parallel to each other, along the guide rails extending in the direction of vehicle travel. Since the support is implemented almost identically on both sides of the seat body 1, the following will refer only to one side, as shown in the Figures.

The front linkage 2 is free to move about a linkage axis 1b on seat body 1, and is attached to an upper rail 4a at a swivel or pivot point 2a. The linkage 3 is attached to a rear linkage axis 1c on the seat body 1, and is attached to the upper rail 4a and is free to move about a lower swivel or pivot point 3c.

An inclination adjustment mechanism 7 operates coaxially with linkage axis 1c that adjusts the linkages 2 and 3 to provide height adjustment for the vehicle seat, and to secure the seat back to the seat body 1 at the selected inclination.

The upper rail 4a is mounted on a lower rail 4b that is secured to the vehicle's chassis, so that the upper rail may move along the direction of vehicle travel. There is a stop mechanism 4c provided on the upper rail that blocks or positions in a stationary manner the upper rail 4a with respect to the lower rail 4b. A tension spring 4d is stretched between the upper rail 4a and the lower rail 4b that tensions the vehicle seat along the direction of vehicle travel. After the arresting mechanism 4c is released, the vehicle seat may be pushed to the desired position by the user against the force of the spring 4d.

Figure 3:
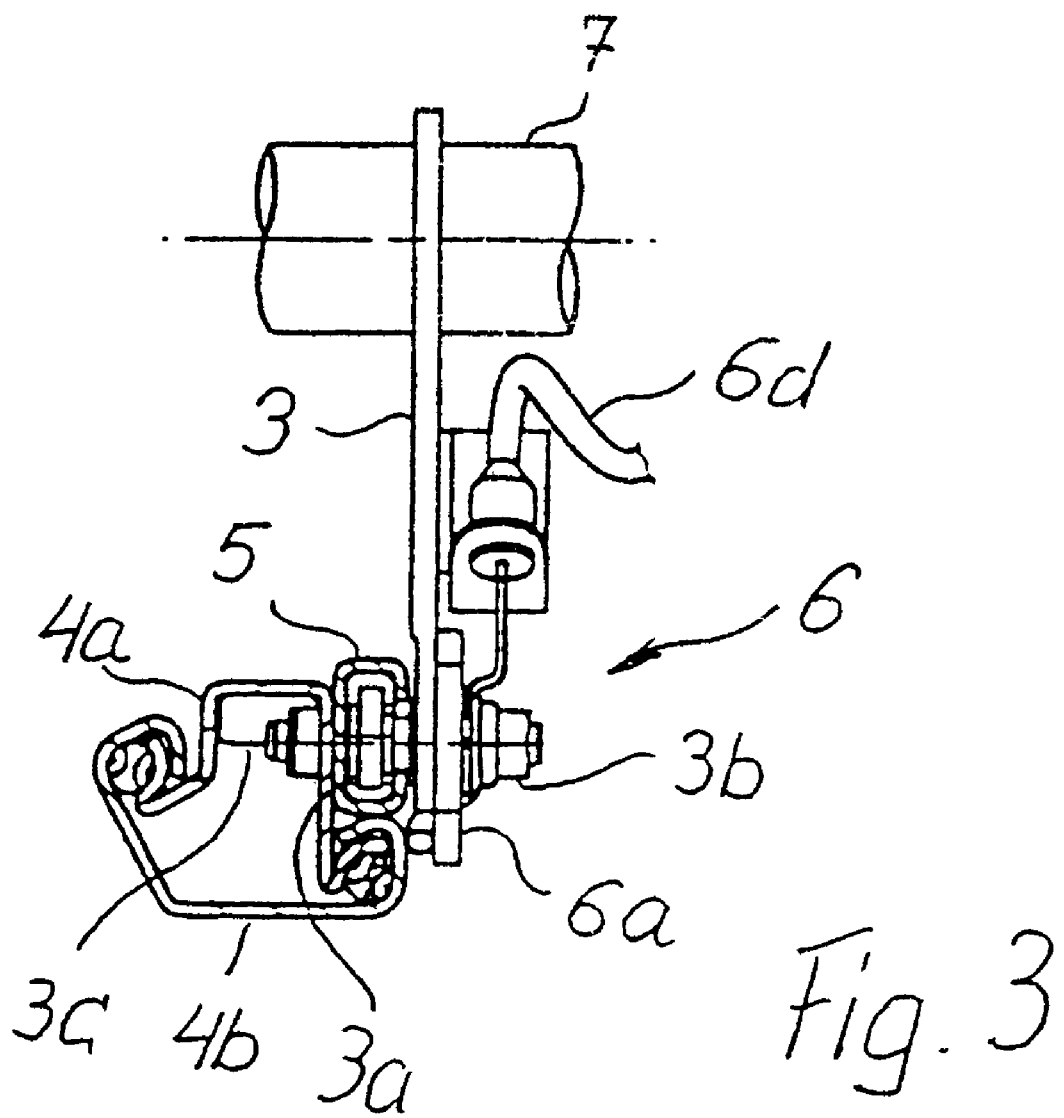
FIG. 3: a cutaway view along the line III—III as in FIG. 1.

A longitudinal guide area 5 formed as a guide rail is provided at the upper rail 4a. This longitudinal guide area 5 guides a sliding piece 3a visible in FIG. 3 with which the rear linkage 3 is connected in an articulated or pivotable manner via a support bushing 3b. The support bushing 3b also supports a latch 6a on the side of the linkage 3 turned away from the sliding piece 3a. The latch 6a belongs to a locking device 6 that locks the seat in its rearward position with respect to the upper rail 4a.

To accomplish this, the latch 6a engages a locking bushing 6b mounted on the rear end of the guide area 5. The latch 6a is tensioned in a clockwise direction by a spring 6c, and is held in the locked position by it. The tension cable of a Bowden or similar cable 6d or other similar release mechanism is attached to the latch 6a and serves to move the latch 6a against the force of the spring 6c. The jacket of the Bowden cable rests against the linkage 3. The tension cable leads to an operating lever at the head of the seat back (not shown).

Figure 2:
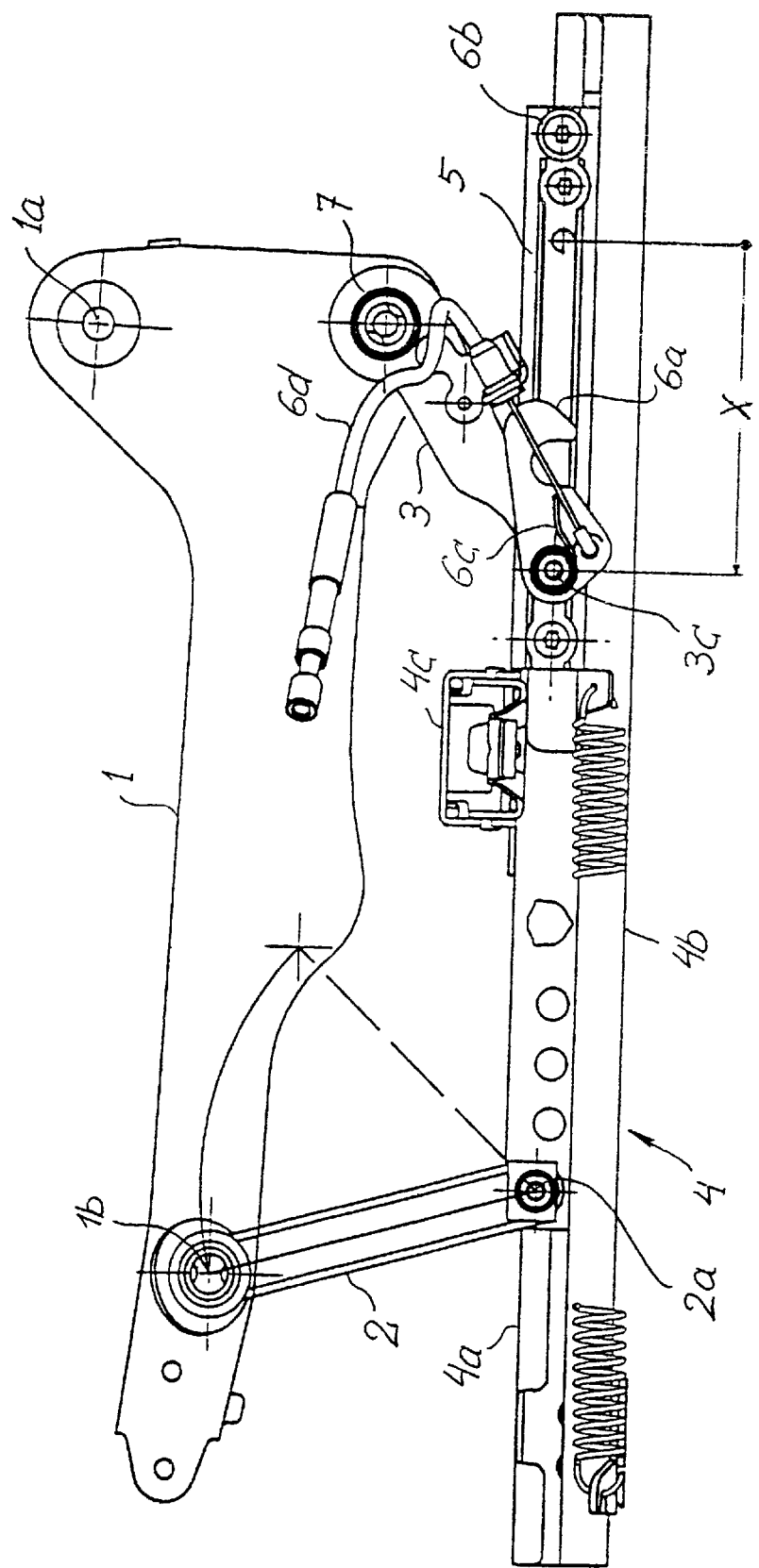
FIG. 2: a side view of the seat body as in FIG. 1 in its position with the seat back tilted forward.

When the seat back tilt lock is released, the locking mechanism 6 is simultaneously released by the Bowden cable 6d. At this time, the latch 6a releases the locking busing 6b. The rear linkage 3 is pushed forward in the longitudinal guide area 5 to its end strike position by means of the force transferred by tilting the seat back forward to the seat body 1. The front linkage 2 is thereby displaced from the rearward position shown in FIG. 1 into the forward position shown in FIG. 2. The entry aperture to the rear seat is thereby enlarged by the amount generally labeled "X" in FIG. 2.

When the seat back is tilted back, a tension force pulling backward is transferred to the seat body 1. Since the Bowden cable 6d is normally no longer actuated, the latch 6a is displaced into its locked position by means of the spring 6c. When the latch 6a reaches its rearmost position, the latch 6a is lifted by the locking bushing 6b until it engages the locking bushing 6b.

Accordingly, the present invention provides a novel seat adjustment and displacement mechanism.

Modifications and substitutions by one of ordinary skill in the art are considered to be within the scope of the present invention, which is not to be limited except by the following claims.

The invention claimed is:

1. A seat having a seat displacement mechanism, comprising:
    a seat having a seat bottom and a seat back that is attached to the seat bottom so that it may be folded forward about a horizontal axis and locked in a use position;
    front and rear linkages mounted in pairs respectively, each front and rear linkage pivotably attached proximate one end to said seat bottom and pivotably attached proximate a second end to a rail mechanism attached to a seat base, at least a portion of said rail mechanism including an upper rail having a portion that is mounted so it may slide relative to a lower rail attached to said seat base;
    a locking device for locking at least one linkage from at least one of said pair of front and rear linkages into said use position; and
    wherein said upper rail includes, proximate at least one pair of said pairs of front and rear linkages, a longitudinal guide area into which said second end of said at least one pair of said pairs of front and rear linkages may be inserted so that at least one of said front and rear linkages may slide forward and be displaced longitudinally a predetermined distance while said other pair of linkages pivot when said locking device is released and said seat back is tilted forward.

2. A seat having a seat displacement mechanism according to claim 1, wherein said pair of rear linkages is mounted to said longitudinal guide area so that it may be displaced longitudinally forward when said locking device is released.

3. A seat having a seat displacement mechanism according to claim 2, wherein said longitudinal guide area is provided on a rear area of said upper rails proximate said pair of rear linkages.

4. A seat having a seat displacement mechanism according to claim 1, wherein the longitudinal guide area is formed as a separate guide rail that is firmly affixed to the upper rail.

5. A seat having a seat displacement mechanism according to claim 1, wherein said locking device includes a moveable latch connected with said pair of rear linkages, such that said moveable latch overlaps a locking bushing mounted on said upper rail.

6. A seat having a seat displacement mechanism according to claim 5, wherein said latch is moveable by means of a cable against a spring pulling the latch toward the locking position.

7. A seat having a seat displacement mechanism according to claim 1, wherein said predetermined distance of said pair of longitudinally displaceable linkages is limited.

8. A seat having a seat displacement mechanism according to claim 1, wherein at least one of said pair of longitudinally displaceable linkages may be locked with respect to said seat base.

9. A seat having a seat displacement mechanism, comprising:
    a seat having a seat bottom and a seat back that is attached to the seat bottom so that it may be folded forward about a horizontal axis and locked in a use position;
    front and rear linkages mounted in pairs respectively, each front and rear linkage pivotably attached proximate one end to said seat bottom and pivotably attached proximate a second end to a rail mechanism attached to a seat base, at least a portion of said rail mechanism including an upper rail having a portion that is mounted so it may slide relative to a lower rail attached to said seat base;
    a locking device for locking at least one linkage from at least one of said pair of front and rear linkages into said use position; and
    wherein said upper rail includes, proximate at least said pair of rear linkages, a longitudinal guide area into which said second end of said pair of rear linkages may be inserted so that at least said rear linkages may slide forward and be displaced longitudinally a predetermined distance while said front pair of linkages pivot when said locking device is released and said seat back is tilted forward.

* * * * *